United States Patent
Wen et al.

(10) Patent No.: US 12,229,370 B2
(45) Date of Patent: Feb. 18, 2025

(54) SYSTEM AND METHOD FOR DISPLAY SYNCHRONIZATION

(71) Applicants: STMICROELECTRONICS (BEIJING) R&D CO., LTD, Beijing (CN); STMICROELECTRONICS LTD, Kowloon (HK)

(72) Inventors: Pengcheng Wen, Beijing (CN); Yuan Yun Wang, New Taipei (TW)

(73) Assignees: STMICROELECTRONICS LTD., Kowloon (HK); STMICROELECTRONICS (BEIJING) R&D CO., LTD, Beijing (CN)

( * ) Notice: Subject to any disclaimer, the term of this patent is extended or adjusted under 35 U.S.C. 154(b) by 0 days.

(21) Appl. No.: 18/459,249

(22) Filed: Aug. 31, 2023

(65) Prior Publication Data
US 2024/0012518 A1    Jan. 11, 2024

Related U.S. Application Data

(62) Division of application No. 17/859,784, filed on Jul. 7, 2022, now Pat. No. 11,775,117.

(51) Int. Cl.
  G06F 3/041   (2006.01)
  G06F 3/044   (2006.01)
  G09G 3/3233  (2016.01)

(52) U.S. Cl.
  CPC ...... *G06F 3/04184* (2019.05); *G06F 3/04166* (2019.05); *G06F 3/0443* (2019.05); *G09G 3/3233* (2013.01); *G09G 2320/0247* (2013.01); *G09G 2330/023* (2013.01); *G09G 2354/00* (2013.01)

(58) Field of Classification Search
  None
  See application file for complete search history.

(56) References Cited

U.S. PATENT DOCUMENTS

| 10,088,965 | B2 | 10/2018 | Karuppusamy et al. |
| 10,338,711 | B2 | 7/2019 | Kim et al. |
| 10,627,958 | B2 | 4/2020 | Zhang et al. |
| 10,802,645 | B2 | 10/2020 | Takeuchi et al. |

(Continued)

FOREIGN PATENT DOCUMENTS

CN    102859431 A    1/2013

*Primary Examiner* — Duane N Taylor, Jr.
(74) *Attorney, Agent, or Firm* — Slater Matsil, LLP

(57) ABSTRACT

A method of operating a display includes performing a non-synchronized touch scan pattern on a display with a controller coupled to the display. The non-synchronized touch scan pattern schedules touch scans independent of a refresh rate of the display. Upon the controller detecting a first synchronization pulse from a display controller coupled to the controller and the display, a first pulse-checking timer is started. Upon detecting a second synchronization pulse from the display controller and before the first pulse-checking timer expires, a first display refresh rate for the display is obtained from an interval between the first synchronization pulse and the second synchronization pulse. A synchronized touch scan pattern is performed with the controller, and is scheduled to avoid touch scans coinciding with refreshes of the display performed at the first display refresh rate.

20 Claims, 9 Drawing Sheets

(56) References Cited

U.S. PATENT DOCUMENTS

| | | |
|---|---|---|
| 10,895,933 B2 | 1/2021 | Cheng et al. |
| 10,971,100 B2 | 4/2021 | Zhang et al. |
| 11,209,932 B2 | 12/2021 | Kitagawa et al. |
| 11,216,144 B2 | 1/2022 | Chen |
| 11,264,446 B2 | 3/2022 | Lee et al. |
| 2012/0050217 A1 | 3/2012 | Noguchi et al. |
| 2015/0084908 A1 | 3/2015 | Jordan |
| 2016/0092010 A1 | 3/2016 | Agarwal et al. |
| 2016/0216833 A1 | 7/2016 | Butler et al. |
| 2022/0019332 A1 | 1/2022 | Ko et al. |
| 2022/0365620 A1 | 11/2022 | Pundak et al. |
| 2023/0152925 A1* | 5/2023 | Shiomura .............. G06F 3/0412 345/173 |

\* cited by examiner

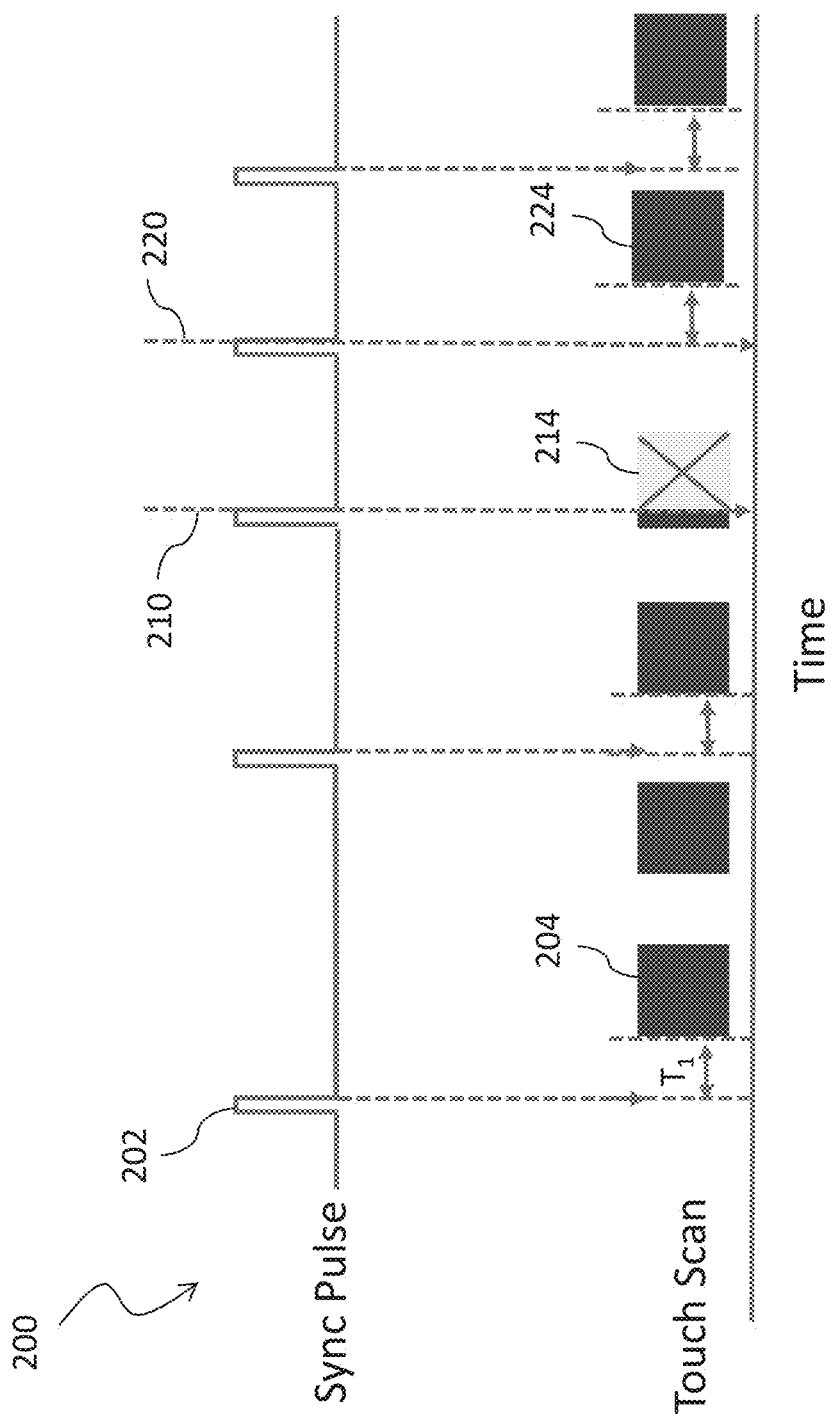

SYSTEM AND METHOD FOR DISPLAY SYNCHRONIZATION

CROSS-REFERENCE TO RELATED APPLICATIONS

This application is a divisional application of U.S. patent application Ser. No. 17/859,784, filed on Jul. 7, 2022, now U.S. Pat. No. 11,775,117 issued Oct. 3, 2023, which application is hereby incorporated herein by reference.

TECHNICAL FIELD

The present invention relates generally to systems and methods for operating displays, and in particular embodiments to touchscreen displays.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Organic light emitting diodes (OLEDs) offer a higher performance display. With the increasing use of OLED displays, thinner OLED displays that are flexible and/or foldable are emerging as a way to increase the size of a display without increasing the size of the device.

However thinner OLED displays come with their own set of advantages and disadvantages. A display panel of an OLED based touchscreen may include a plurality of pixels arranged in rows and columns across a display layer in a matrix like formation. Each pixel may include an OLED configured to generate light based on the current driven through it. However, sensing scans to detect touch (also referred to as touch scans) may cause noticeable display flicker due to touch affecting negative supply voltage ($ELV_{SS}$) of the OLEDs.

SUMMARY

In accordance with an embodiment, a method of operating a display includes: performing, on a touchscreen of a display, a non-synchronized touch scan pattern with a controller coupled to the display, where the non-synchronized touch scan pattern schedules touch scans independent of a refresh rate of the display; upon the controller detecting a first synchronization pulse from a display controller coupled to the controller and the display, starting a first pulse-checking timer having an expiration after a fixed duration; upon detecting a second synchronization pulse from the display controller and before the first pulse-checking timer expires, obtaining a first display refresh rate for the display from an interval between the first synchronization pulse and the second synchronization pulse; and performing a first synchronized touch scan pattern with the controller, the first synchronized touch scan pattern being scheduled to avoid touch scans coinciding with refreshes of the display performed at the first display refresh rate.

In accordance with another embodiment, a method of operating a touchscreen includes: performing a first synchronized touch scan pattern with a controller coupled to a display, the first synchronized touch scan pattern being scheduled to avoid touch scans coinciding with refreshes of the display performed at a first display refresh rate, where display controller provides synchronization pulses to the controller while performing at the first display refresh rate, the synchronization pulses being separated by a first interval; upon detecting a pair of synchronization pulses being separated by a second interval, the second interval being different from the first interval, obtaining a second display refresh rate from the second interval; and performing a second synchronized touch scan pattern with the controller coupled to the display, the second synchronized touch scan pattern being scheduled to avoid touch scans coinciding with refreshes of the display performed at the second display refresh rate.

In accordance with yet another embodiment, a touchscreen controller includes: a non-transitory memory including a program; and a processor coupled to the non-transitory memory and configured to execute the program, the program including instructions to: upon startup, run a display at a default non-synchronized touch scan pattern, the display being coupled to the touchscreen controller; stop a touch scan being executed upon detecting a synchronization pulse received from a display controller, the display controller being coupled to the touchscreen controller and the display; obtain a display refresh rate from intervals between synchronization pulses received from the display controller; and run the display with a synchronized touch scan pattern, the synchronized touch scan pattern being scheduled to avoid touch scans coinciding with refreshes of the display performed at the display refresh rate.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a graphical representation of synchronization signals and touch scans versus time, in accordance with some embodiments;

Figure 1A:
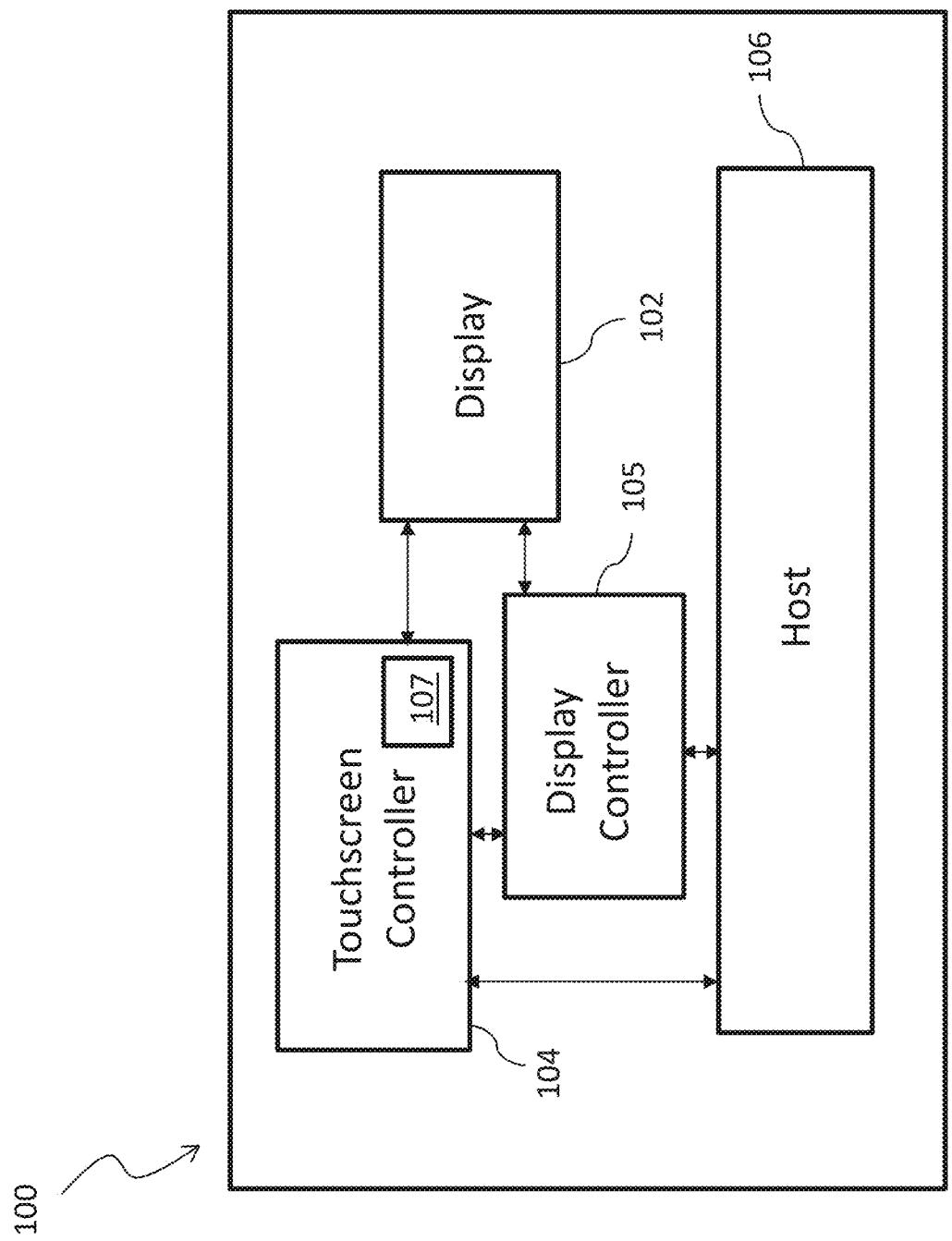
FIG. 1A illustrates a block diagram of an electronic device, in accordance with some embodiments.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The references used herein are provided merely for convenience and hence do not define the extent of protection or the scope of the embodiments.

According to one or more embodiments of the present disclosure, this application relates to systems and methods for operating touchscreen displays. While organic light emitting diode (OLED) touchscreens have led to great advances in the evolution of portable devices, limitations still exist.

Conventional OLED devices may include a display panel that may include a plurality of pixels arranged in rows and columns across a display layer in a matrix like formation. Each pixel may include an OLED configured to generate light based on the current driven through it.

In operation, an OLED display may be refreshed (e.g., updated) in each of a plurality of display frames bounded by a vertical synchronization signal (Vsync). During each display frame, each row of pixels are updated sequentially according to a horizontal synchronization signal (Hsync) and touch scans (e.g., mutual and self-sensing scans) are performed.

Problematically, however, when touch scans are performed, their additional current draws (i.e. required energy) may reduce the current flowing through OLEDs. In such cases, especially as OLED touchscreens are becoming thinner, this may result in a dimming of the light illuminated by the OLEDs and result in noticeable display flicker.

Typically, to prevent flicker, touch scans are performed during idle time in a display frame after the display is finished updating. This is accomplished by delaying the performance of self-sensing scans until after Hsync is finished being transmitted. In other words, touch scans are delayed (synchronized) according to Vsync.

Increasingly, OLED displays may incorporate backplanes with low-temperature polycrystalline oxide (LTPO). The inclusion of LTPO enables OLED displays to work with very low refresh rates (e.g., 60 Hz, 30 Hz, 10 Hz, or the like). OLED displays using low-temperature polycrystalline oxide can have reduced power consumption by varying the refresh rate. For example, smartphones using OLED displays with LTPO may dynamically change the refresh rate to improve performance and power consumption.

To conserve power, OLED displays may be updated at variable speeds while changing the refresh rate. However, flicker may be easily seen by human eyes at low refresh rates (e.g., 60 Hz, 30 Hz, 10 Hz, or the like). Flicker may be influenced by touch scanning, including both mutual scans and self-sensing scans. Flicker can be reduced by a touchscreen controller checking the display refresh rate from intervals between synchronization signals (e.g., Vsync pulses). The touchscreen controller then adjusts the time delay and touch scan interval to reduce or prevent display flicker and get the desired touch report rate.

The synchronization pulses may operate independently of the touchscreen controller, so that the source of the synchronization pulses (e.g., a host) can freely change the display refresh rate without notifying the touchscreen controller. As such, embodiments of the disclosure may be implemented in a touchscreen controller without any requirements or changes in other components of the OLED device (e.g., the host). When the host increases the display refresh rate, the interval between successive synchronization pulses is shortened. As such, when the touchscreen controller detects that the host has increased the display refresh rate, the touchscreen controller stops the current touch scan to avoid display flicker, recalculates the current refresh rate, and schedules a new touch scan pattern to avoid touch scans coinciding with a refresh of the display. When the host decreases the display refresh rate or fails to send the synchronization signal at the scheduled time, the touchscreen controller detects that the expected synchronization signal is missing. The touchscreen controller then switches to a non-synchronized touch scan mode in order to maintain the current touch report rate until subsequent synchronization signals are detected and allow the touchscreen controller to obtain the new display refresh rate. The touchscreen controller then switches to a synchronized touch scan mode compatible with the decreased display refresh rate.

Embodiments of the disclosure are described in the context of the accompanying drawings. An embodiment of an electronic device having a touchscreen controller configured to mitigate flicker by synchronizing touch scans with synchronization signals will be described using FIGS. 1A-1D. An embodiment of a method for synchronizing touch scans with synchronization signals will be described using FIG. 2. An embodiment of another method for synchronizing touch scans with synchronization signals will be described using FIG. 3. Embodiments of methods for operating displays will be described using FIGS. 4-6.

FIG. 1A illustrates a block diagram of an electronic device 100, in accordance with some embodiments. The electronic device 100 may include a display 102, a touchscreen controller 104, a display controller 105, and a host 106. The electronic device 100 may be a smart phone, a GPS device, a tablet computer, a mobile media player, a laptop, a gaming system, a personal computer, or any other electronic device that may utilize a touch sensitive display 102.

The display 102 (also referred to as a touchscreen) may be a wide quad HD (WQHD) display, organic light emitting diode (OLED) display, an LED display, or any other type of display. The display 102 may include a plurality of pixels in a display layer configured to display an image. The display layer of the display 102 may include a plurality of scan lines that extend across the rows of the display 102, and data lines that extend across the columns of the display 102. The scan lines and the data lines may be connected to each of the pixels. In other words, each of the plurality of pixels may be positioned at each of the intersections between the data lines and scan lines. The display 102 may also include a touch-sensing layer configured to detect touches made on the display 102. This will be shown in more detail below.

The touchscreen controller 104 may perform various methods with respect to the display 102. In various embodiments, the touchscreen controller 104 may be a processor that analyzes information and carries out a series of executable scripts, e.g., stored in a memory integrated in the touchscreen controller 104. For example, the memory may include non-transitory memory such as read-only memory (ROM) storing firmware or random access memory (RAM). In one or more embodiments, the processor may comprise an application-specific integrated circuit (ASIC) device, a central processing unit (CPU), or any other processing unit known in the art. In various embodiments, the touchscreen controller 104 may comprise a number of separate computing units such as cores integrated within one processor, or distinct separate processing chips. In various embodiments, the touchscreen controller 104 transmits touch driving signals (TDS) to the touch sensing layer, and sensed touch sensing signal (TSS) sensed on the touch sensing layer. The touchscreen controller 104 may then analyze the touch sensing signals and report touch coordinates to the host 106. In various embodiments, the touchscreen controller 104 includes a clock 107 that may be used to measure intervals between synchronization pulses received from the host 106. The clock 107 may include or utilize any suitable clock available to the touchscreen controller 104, such as an internal clock or external clock.

Similarly, the display controller 105 may perform various methods with respect to the display 102. In various embodiments, the display controller 105 may be a processor that analyzes information and carries out a series of executable scripts, e.g., stored in a memory integrated in the display controller 105. Alternatively, the display controller 105 and the touchscreen controller 104 may share a common memory. In one or more embodiments, the processor may comprise an application-specific integrated circuit (ASIC) device, a central processing unit (CPU), or any other processing unit known in the art. In various embodiments, the display controller 105 may refresh an image displayed on the display 102 based on a display refresh rate and/or synchronization signals received from the host 106. This will be described in more detail below.

In various embodiments, the host 106, also referred to as a system on a chip or an application processor, comprises a processor, interface, circuitry, and/or the like configured to direct the flow of input and output data to the display 102 and the associated touchscreen controller 104 and display controller 105. For example, the host 106 may be the CPU of a smartphone. A memory may be coupled to or otherwise integrated with the host 106. The memory may be programmed for short term and/or long term memory storage. The memory may comprise various programs to be executed in the host 106. The memory may include both volatile and non-volatile memories. The host 106 may be configured to, e.g., transmit image data, updated display refresh rates, and/or synchronization signals to the display controller 105 and to receive touch coordinates from the touchscreen controller 104.

In various embodiments, the synchronization signals transmitted by the display controller 105 to the touchscreen controller 104 may include a horizontal synchronization signal (Hsync) and a vertical synchronization signal (Vsync). The display controller 105 may receive the image data and transmit processed image data to the pixels on the display 102 based on Hsync or Vsync to refresh the image displayed on the display 102. The touchscreen controller 104 may perform touch scan according the synchronization signals.

The display controller 105 may convert the image into data signals in the form of analog voltages, hold the data signals, and transmit the data signals to each of the plurality of data lines based on the synchronization signals transmitted by the display controller 105 to the touchscreen controller 104. Similarly, the display controller 105 may generate and sequentially transmit scan signals to the plurality of scan lines based on the synchronization signals.

The touchscreen controller 104 may be configured to detect touches on the display 102 via a touch-sensing layer. In other words, the touchscreen controller 104 may be configured to send touch driving signals (TDS) to the display 102, receive touch sensing signals (TSS) in return from the display 102, process the TSS to determine coordinates of touch, and report them to the host 106. Then based on the touch data collected from scanning, the display 102 may be used by the touchscreen controller 104 to determine the coordinates of touch, and report them to the host 106. Then, the host 106 may provide an output to the display 102 based on the reported coordinates of touch.

As will be further described in more detail below (see FIGS. 2-4), the touchscreen controller 104 may be configured to mitigate flicker by synchronizing touch scans with synchronization signals from the display controller 105 (e.g., Vsync pulses). In other words, the touchscreen controller 104 may perform mutual and self-sensing scans at different start times measured with respect to a temporal parameter of the synchronization signals.

Figure 1B:
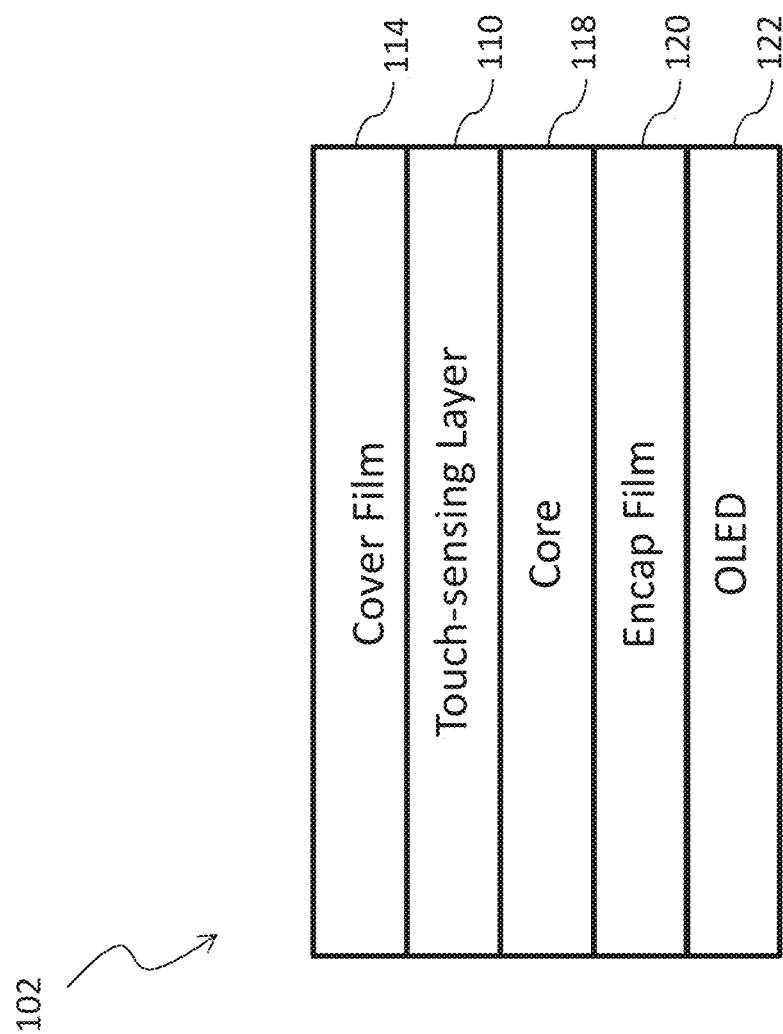
FIG. 1B illustrates a cross-sectional view of a display of the electronic device, in accordance with some embodiments.

FIG. 1B illustrates a cross-sectional view of the display 102, in accordance with some embodiments. The display 102 may include a plurality of layers. In various embodiments the display 102 comprises a cover film 114, a touch-sensing layer 110, a core 118, an encapsulation film 120, and an OLED layer 122. The cover film and the touch-sensing layer may be situated on the front facing side of the electronic device 100.

The OLED layer 122 may comprise a plurality of OLED elements formed across rows and columns of the touchscreen in a matrix like formation. The OLED elements may be configured to transmit light having a color (such as red, green, or blue) with a brightness based on the current they are driven with. In various embodiments, the OLED layer 122 incorporates a backplane with low-temperature polycrystalline oxide (LTPO). The inclusion of LTPO enables the OLED layer 122 to work with very low refresh rates (e.g., 60 Hz, 30 Hz, 10 Hz, or the like). The OLED layer 122 will be explained in more detail below.

The encapsulation film 120 may be formed and in direct contact with the OLED layer. The encapsulation film 120 may function to prevent oxygen, water, or moisture from external sources reaching into and damaging the OLED layer. The encapsulation film 120 may comprise one or more layers of material. For example, the encapsulating film may comprise silicon dioxide, silicon nitride, or any other encapsulation films known in the art.

A core 118 may be formed over the encapsulation film 120. The core 118 may be used for controlling the characteristics of the display 102 such as external light reflection, color accuracy, luminance, and so on. For example, the core 118 may include multiple layers such as a reflection control layer that includes color filters, a lens layer corresponding to each OLED element of the OLED layer 122, and the like.

The touch-sensing layer 110 may be formed over the core 118. The touch-sensing layer no may be a capacitive touch panel configured to detect touches made to the display 102. This will be explained in more detail below.

The cover film 114 may be a protective layer to protect the touch-sensing layer no. The cover film 114 may comprise a transparent material such as a thin layer of glass including silicon dioxide.

The display 102 described above with respect to FIG. 1B is for example purposes only and is not limited by this application. Additional layers known in the art may also be included in the display 102.

Figure 1C:
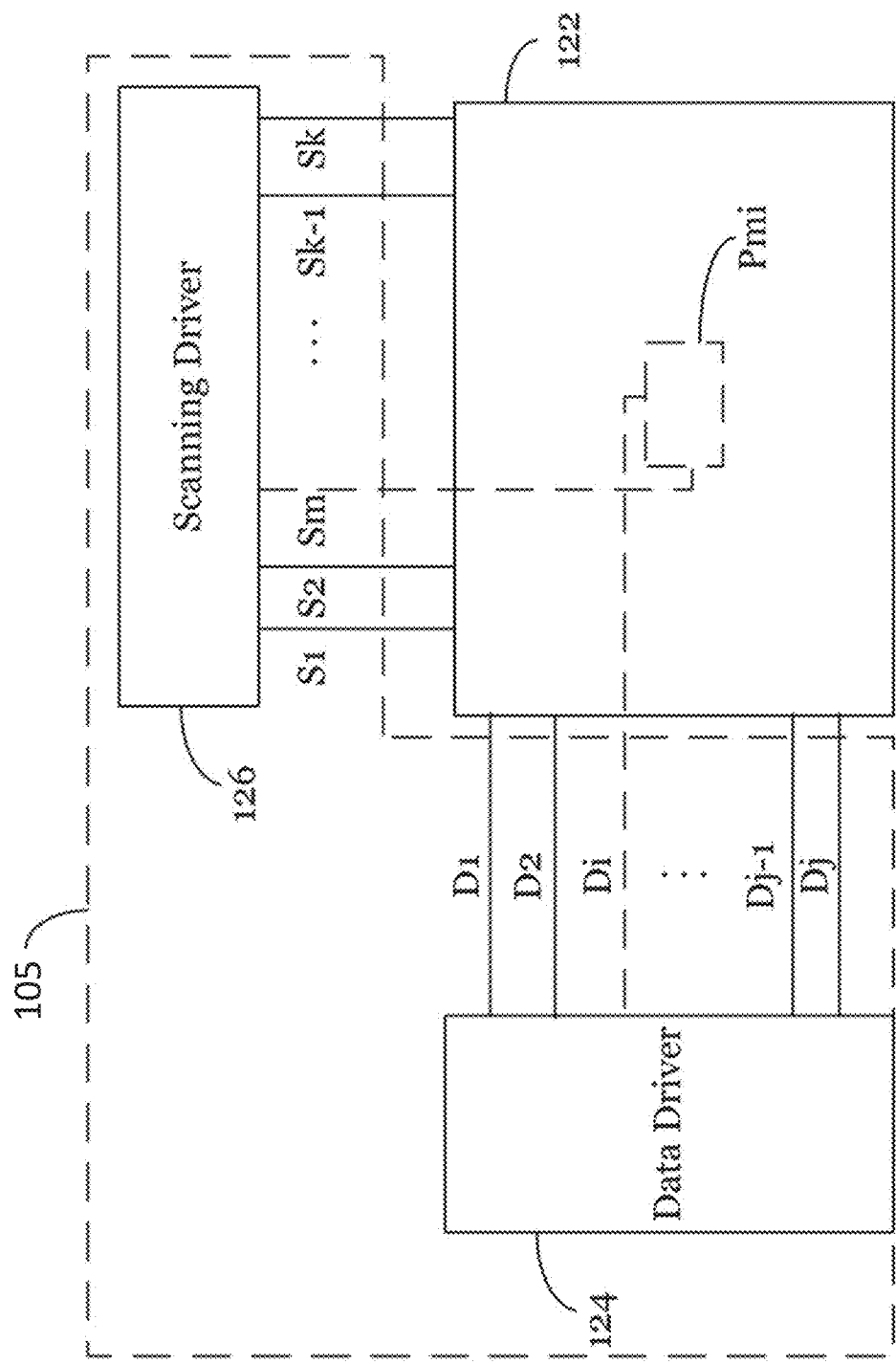
FIG. 1C illustrates a schematic of a display layer and display controller of the electronic device, in accordance with some embodiments.

FIG. 1C illustrates a schematic of the OLED layer 122 and display controller, in accordance with some embodiments. The OLED layer 122 of the display 102 may include a plurality of pixel circuits Pmi that are each connected to a plurality of scan lines S1-Sk and a plurality of data lines D1-Dj. The plurality of scan lines S1-Sk may be coupled to a scanning driver 126 and the plurality of data lines D1-Dj may be coupled to the data driver 124. The scanning driver 126 and the data driver 124 may be included in the display controller 105. The scan lines S1-Sk may be formed in rows across the OLED layer 122 while the data lines D1-Dj are formed in columns across the OLED layer 122.

Figure 1D:
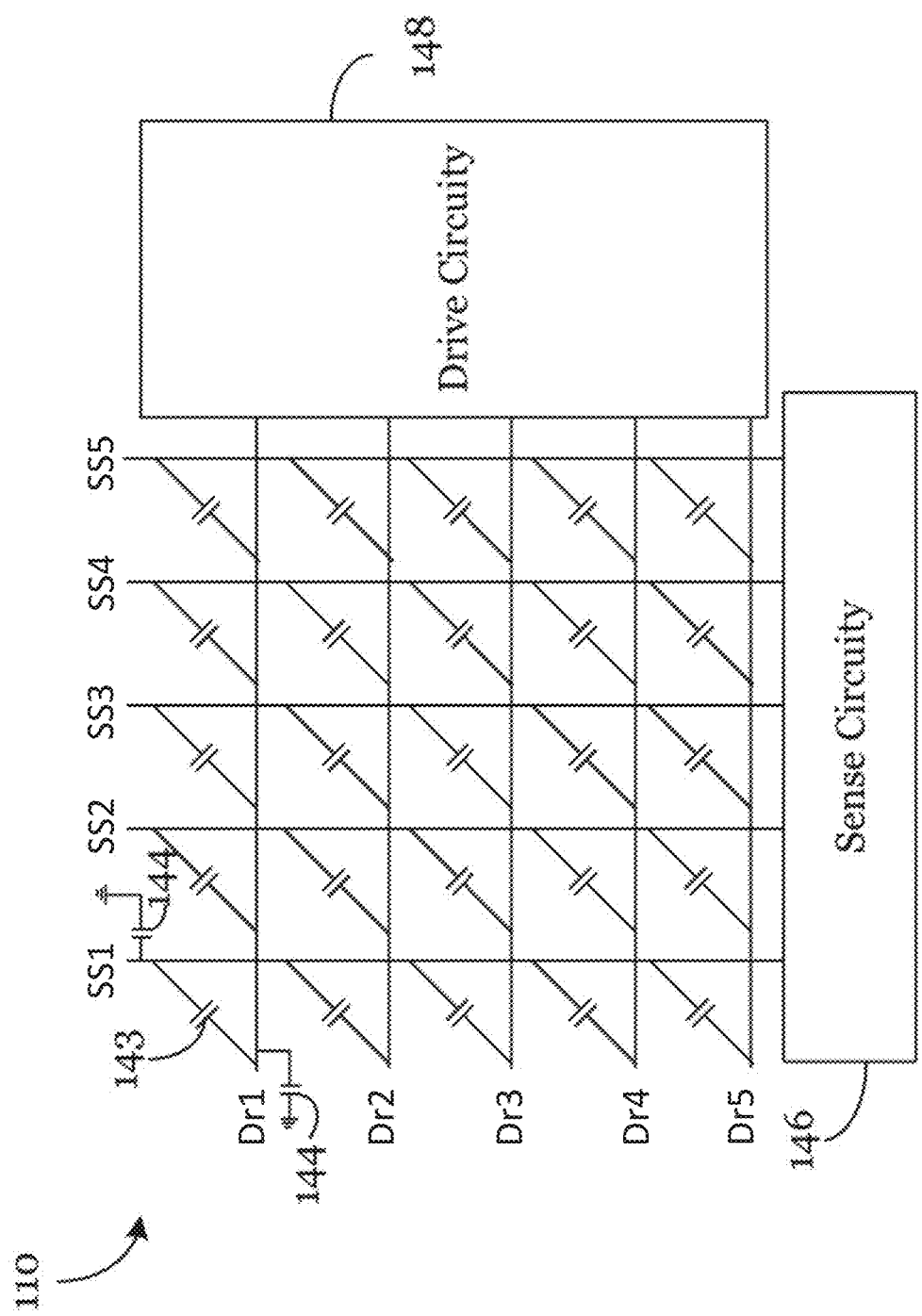
FIG. 1D illustrates a schematic of a touch-sensing layer of the electronic device, in accordance with some embodiments.

Each of the scan lines S1-Sk and each of the data lines D1-Dj may be coupled to a plurality of pixel circuits Pmi that are arranged in a matrix across the OLED layer 122 of the display 102. The scan lines S1-Sk may be configured to transmit scan signals generated by the scanning driver 126 of the display controller 105 and the data lines D1-Dj may be configured to transmit data signals generated by the data driver 124 of the display controller 105 to each of the pixel circuits Pmi. Although FIG. 1D illustrates a single pixel circuit Pmi, formed at the intersection of scan line Sm and data line Di, this is for example purposes only.

The plurality of scan signals may be configured to supply a turn-on voltage to a switching transistor in each of the pixel circuits. The data signals may be configured to transmit image data to each of the pixel circuits Pmi. The scan signals and the data signals may be analog voltages generated by the touchscreen controller 104 based on the image data transmitted from the host 106.

Each pixel circuit Pmi may include an organic light emitting diode (OLED). The OLED may be configured to emit light with a brightness based on a current flowing through it. As understood by those with ordinary skill in the art, the image displayed by the display 102 may be updated in a plurality of display frames. In various embodiments, each of the plurality of display frames may be bounded by the vertical synchronization signal (Vsync). The frequency of Vsync is variable and may be determined based on the required refresh rate of the display 102. In various embodiments, the OLED layer 122 can work with very low refresh rates (e.g., 60 Hz, 30 Hz, 10 Hz, or the like) by including a backplane having LTPO. OLED displays using low-temperature polycrystalline oxide can have reduced power consumption by varying the refresh rate. In other words, the frequency of Vsync may be changed to conserve power.

When the display controller 105 transmits Vsync, using the scanning driver 126, the display controller 105 may be configured to sequentially transmit the plurality of scan signals Scan[1]-Scan[k] via each of the corresponding scan lines St-Sk. The scan signals Scan[1]-Scan[k] may be control voltages transmitted sequentially to the gates of the switching transistor of the pixel circuits Px that may be transmitted during the duration of time that Vsync is transmitted.

Data may be transmitted to pixel circuits according to the horizontal synchronization signal (Hsync). In other words, the data signals Vdata[1]-Vdata[j] may be transmitted when Hsync is transmitted. When Hsync is transmitted to the touchscreen controller 104, using the data driver 124, the touchscreen controller 104 may be configured to transmit data signals Vdata[1]-Vdata[j] via each of the corresponding data lines D1-Dj. The frequency of Hsync may be determined based on the resolution of the display 102 and may be greater than the frequency of Vsync. For example the frequency of Hsync may be 60 Hz, 120, Hz, 240 Hz, 480 Hz, 720 Hz, and so on. To conserve power without changing the refresh rate of the display 102, Hsync may be changed between frames.

When the display controller 105 transmits Vsync, using the scanning driver 126, the touchscreen controller 104 may be configured to sequentially transmit the plurality of scan signals Scan[1]-Scan[k] via each of the corresponding scan lines St-Sk. The scan signals Scan[1]-Scan[k] may be control voltages transmitted sequentially to the gates of the switching transistor of the pixel circuits Px that may be transmitted during the duration of time that Vsync is transmitted.

FIG. 1D illustrates a schematic of the touch-sensing layer no, in accordance with some embodiments. The touch-sensing layer no may comprise drive lines Dr1-Dr5 and sense lines SS1-SS5 that span the entirety of the display 102 in a grid-like fashion that are operable by the touchscreen controller 104. In various embodiments, the drive lines Dr1-Dr5 may be formed in rows across the display 102 and the sense lines SS1-SS5 may be formed in columns across the display 102. In other embodiments, the drive lines Dr1-Dr5 may be formed in columns across the display 102 and sense lines SS1-SS5 may be formed in rows across the display 102. In various embodiments, the number of drive lines may be equal to the number of sense lines. Although five drive lines and five sense lines are illustrated in FIG. 1D, this is not indicative of the number of drive and sense lines that may be present on the touch sensing layer. The number of drive and sense lines used are not limited by this application.

The drive lines Dr1-Dr5 and the sense lines SS1-SS5 may overlap in certain embodiments. While FIG. 1D depicts the drive lines Dr1-Dr5 and the sense lines SS1-SS5 overlapping in an orthogonal manner, they may overlap other than orthogonally such as being interleaved or at various angles. The drive lines Dr1-Dr5 and the sense lines SS1-SS5 may have a measurable mutual capacitance at their intersections as to form a matrix of mutual capacitors with mutual capacitances 143.

In various embodiments, the drive lines Dr1-Dr5 may be coupled to drive circuitry 148 and the sense lines SS1-SS5 may be coupled to sense circuitry 146 of the touchscreen controller 104. Alternatively, the drive circuitry 148 and the sense circuitry 146 may be incorporated into a separate touchscreen controller. As appreciated by those with ordinary skill in the art, each of the drive lines and the sense lines may also have a self-capacitance 144 that is measurable. In other words, the drive lines Dr1-Dr5 and the sense lines SS1-SS5 are operable in mutual sensing mode and a self-sensing mode.

Flicker may be induced by the current draw required by the touchscreen controller 104 to detect touch on the display 102. In other words, the energy or current draw required for touch sensing may reduce the current flowing through the OLEDs of the pixel circuits Px. This may result in a reduced brightness of the display 102, resulting in noticeable flicker on the display 102 by a user.

Figure 3:
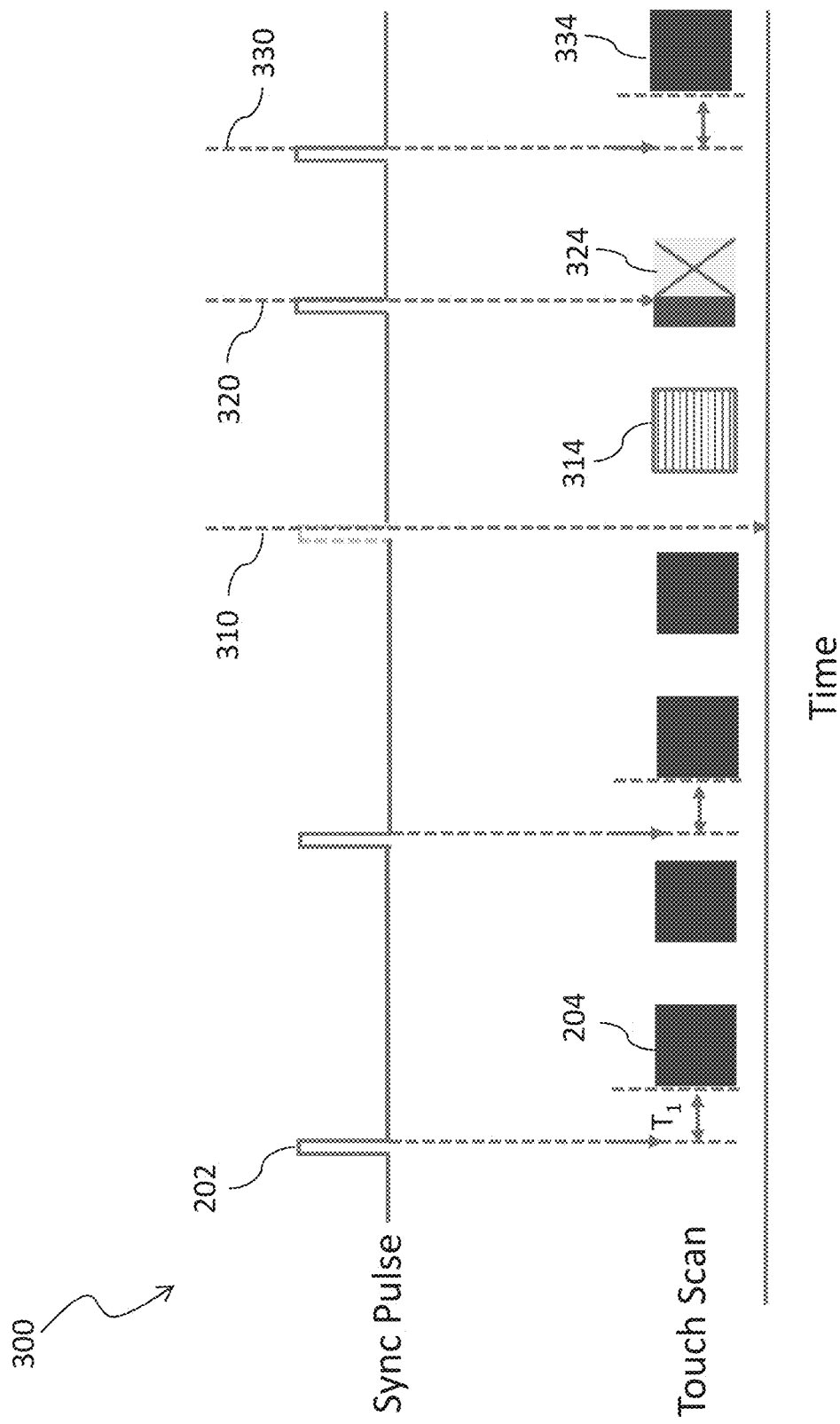
FIG. 3 illustrates another graphical representation of synchronization signals and touch scans versus time, in accordance with some embodiments.

FIGS. 2 and 3 illustrate methods of adjusting touch scan rate in order to reduce or prevent display flicker from touch scans with a changing display refresh rate. The touchscreen controller 104 checks the display refresh rate from intervals between synchronization signals (e.g., Vsync pulses) and then adjusts the time delay and touch scan interval to reduce or prevent display flicker while retaining the desired touch report rate. Synchronization signals (e.g., Vsync) may be provided by the display controller 105 independently of the touchscreen controller 104, so that the host 106 may freely change the display refresh rate without notifying the touchscreen controller 104. As such, embodiments may be implemented in the touchscreen controller 104 without any requirements or changes in the host 106 or other components of the electronic device 100.

FIG. 2 illustrates a graph of synchronization signals and touch scans versus time, in accordance with some embodiments. The graph illustrates a method 200 for the touchscreen controller 104 to adjust the touch scan pattern when the host 106 increases the display refresh rate.

As illustrated in FIG. 2, the display controller 105 provides synchronization pulses 202 (e.g., Vsync pulses, Hsync pulses, or the like) to the touchscreen controller 104, which measures the interval between the synchronization pulses 202 (e.g., 33.3 ms) to obtain the current display refresh rate (e.g., 30 Hz). To avoid display flicker, a touch scan 204 is performed by touchscreen controller 104 after each synchronization pulse 202 by a delay time $T_1$. Additionally, the touchscreen controller 104 may perform one or more touch scan 204 before the next synchronization pulse 202. In the example illustrated in FIG. 2, two touch scans 204 are performed between the synchronization pulses 202. However, any suitable number of touch scans 204 may be performed between the synchronization pulses 202 to achieve a desired touch report rate while reducing or preventing display flicker.

When the host 106 increases the display refresh rate at time 210, the interval between successive synchronization pulses 202 is shortened. As such, when the touchscreen controller 104 determines that the host 106 has increased the display refresh rate by receiving a synchronization pulse 202 before the expected time, the touchscreen controller 104 stops the current touch scan 214 to avoid display flicker.

When the touchscreen controller 104 detects the next synchronization pulse 202 at time 220, the touchscreen controller 104 calculates the new interval between synchronization pulses 202 (e.g., 16.7 ms) and obtains the new display refresh rate (e.g., 60 Hz). The touchscreen controller 104 then schedules a new pattern for touch scans 224 in order to avoid the touch scans 224 coinciding with a refresh of the display 102 and causing display flicker.

In the illustrated example of FIG. 2, the new pattern for the touch scans 224 includes one touch scan 224 between each pair of synchronization pulses 202 provided by the display controller 105 at the increased display refresh rate. However, any suitable number of touch scans 224 between each pair of synchronization pulses 202 may be used.

The method 200 may be implemented in the touchscreen controller 104 or other suitable device by instructions contained in software, firmware, hardware, or a combination thereof. For example, the method 200 can be loaded into firmware of the touchscreen controller 104. However, the touchscreen controller 104 may also be programmed with the method 200 by software instructions, or the touchscreen controller 104 may contain the instructions for the method 200 in its hardware (e.g., as an ASIC).

FIG. 3 illustrates a graph of synchronization signals and touch scans versus time, in accordance with some embodiments. The graph illustrates a method 300 for the touchscreen controller 104 to adjust the touch scan pattern when the display controller 105 fails to provide a synchronization pulse at the expected time.

As illustrated in FIG. 3, the display controller 105 provides synchronization pulses 202 (e.g., Vsync pulses, Hsync pulses, or the like) to the touchscreen controller 104, which measures the interval between the synchronization pulses 202 (e.g., 33.3 ms) to obtain the current display refresh rate (e.g., 30 Hz). The touchscreen controller 104 performs a touch scan after each synchronization pulse 202. Additionally, the touchscreen controller 104 may perform one or more touch scan 204 before the following synchronization pulse 202. In the example illustrated in FIG. 3, two touch scans 204 are performed between the synchronization pulses 202, but any suitable number of touch scans 204 may be performed between consecutive synchronization pulses 202.

When the display controller 105 fails to provide an expected synchronization pulse 202 at time 310, the touchscreen controller 104 switches to a non-synchronized touch scan pattern and performs a first non-synchronized touch scan 314 in order to maintain a desired touch report rate. The display controller 105 failing to provide the expected synchronization pulse 202 may be due to the host changing the display refresh rate to a slower display refresh rate or to an anomalous omission of a regularly scheduled synchronization pulse 202. The non-synchronized touch scan pattern of the touchscreen controller 104 schedules touch scans 314 independently of a display refresh rate. In other words, the touch scan may be performed at any time irrespective of whether a display refresh is being performed. By switching to the non-synchronized touch scan pattern, the touchscreen controller 104 may maintain the desired touch report rate and avoid situations where touch reporting is frozen and the electronic device 100 (see above, FIG. 1) fails to respond to touches of a user.

The touchscreen controller 104 continues the non-synchronized touch scan pattern until a time 320 when another synchronization pulse 202 is received from the display controller 105. The touchscreen controller 104 then stops the current touch scan 314 to avoid display flicker and waits to receive the next synchronization pulse 202 in order to obtain the new display refresh rate.

When the touchscreen controller 104 detects the next synchronization pulse 202 at time 330, the touchscreen controller 104 calculates the new interval between synchronization pulses 202 (e.g., 16.7 ms) and obtain the new display refresh rate (e.g., 60 Hz). The touchscreen controller 104 then schedules a new pattern for touch scans 334 in order to avoid the touch scans 324 coinciding with a refresh of the display 102 and causing display flicker. The new interval after time 320 between consecutive synchronization pulses 202 being smaller than the previous interval between consecutive synchronization pulses 202 before time 310 is illustrated as a non-limiting example. The new interval after time 320 between consecutive synchronization pulses 202 may also be larger than the previous interval between consecutive synchronization pulses 202 before time 310, which may correspond to the host 106 changing from a faster display refresh rate before time 310 to a slower display refresh rate after time 320.

As described above with respect to the method 200, the method 300 may be implemented in the touchscreen controller 104 or other suitable device by instructions contained in software, firmware, hardware, or a combination thereof, and the details are not repeated herein.

Figure 4:
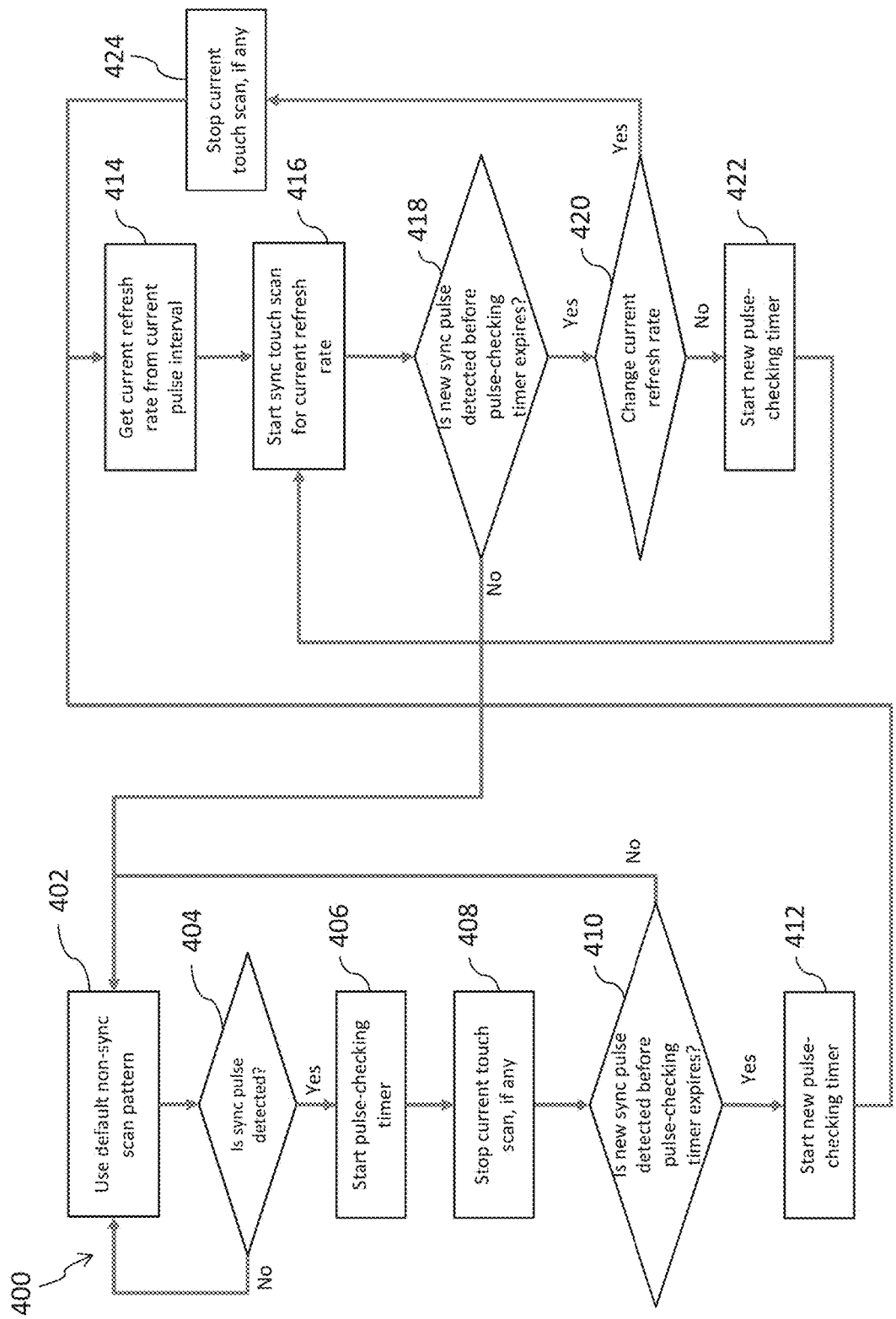
FIG. 4 illustrates a flowchart of a method for operating a display, in accordance with some embodiments.

FIG. 4 illustrates a flowchart of a method 400 for operating a display 102, in accordance with some embodiments. The method 400 includes the method 200 as described above with respect to FIG. 2 and the method 300 as described above with respect to FIG. 3 in a single algorithm. However, any algorithm including the method 200 or the method 300 in any suitable combination of steps is within the scope of the disclosed embodiments.

Step 402 is the start point of the method 400, and the touchscreen controller 104 may begin at step 402 at a startup of its operation (e.g., before it receives any synchronization pulses 202 from the display controller 105). In step 402, the touchscreen controller 104 uses a default non-synchronized touch scan pattern in order to detect touches by a user at a desired touch response rate before any information about the display refresh rate is provided by the host 106.

Next, in step 404, the touchscreen controller 104 checks if a synchronization pulse 202 has been received. If no synchronization pulse 202 is detected, the touchscreen controller 104 returns to step 402 and continues the default non-synchronized touch scan pattern until a synchronization pulse 202 is detected. If a synchronization pulse 202 is detected, the touchscreen controller 104 continues to step 406.

In step 406, the touchscreen controller 104 starts a first pulse-checking timer while waiting to receive the next synchronization pulse 202. The first pulse-checking timer has an expiration with a fixed duration and counts down to measure an interval to the next expected synchronization pulse 202. In various embodiments, the first pulse-checking timer measures time using a clock 107 of the touchscreen controller 104. In step 406, the touchscreen controller 104 has not yet received information on the display refresh rate from the host 106, so the first pulse-checking timer may be set to count down over a default interval (e.g., 16.7 ms) for a common display refresh rate (e.g., 60 Hz). However, any suitable default interval may be used.

Next, in step 408, the touchscreen controller 104 stops any touch scan being executed when the synchronization pulse 202 is received in step 404. This reduces or prevents display flicker that may occur when a touch scan coincides with a refresh of the display 102. In various embodiments, step 408 is performed simultaneously or immediately after step 406.

In the following step 410, the touchscreen controller 104 checks if a synchronization pulse 202 is received before the first pulse-checking timer expires. If no synchronization pulse 202 is received before the first pulse-checking timer expires, then the touchscreen controller 104 returns to step 402 and uses the default non-synchronized touch scan pattern. If a synchronization pulse 202 is received before the first pulse-checking timer expires, then the touchscreen controller 104 proceeds to step 412.

In step 412, the touchscreen controller 104 starts a second pulse-checking timer to count down over a time interval equal to the time measured between the synchronization pulse 202 detected in step 404 and the synchronization pulse 202 detected in step 410. This interval is the current pulse interval from the display controller 105. The second pulse-checking timer is set to count down until the next expected synchronization pulse 202 from the display controller 105 (see below, step 418).

Next, in step 414, the touchscreen controller 104 obtains the current display refresh rate from the current pulse interval measured between the two most recently received synchronization pulses 202 (e.g., the synchronization pulse 202 detected in step 404 and the synchronization pulse 202 detected in step 410). As an example, when the current pulse interval is 33.3 ms, the display refresh rate is 30 Hz. The touchscreen controller 104 then moves to step 416.

In step 416, the touchscreen controller 104 starts a synchronized touch scan pattern that is synchronized with the current display rate found in step 414. The synchronized touch scan pattern is scheduled in order to avoid the touch scans coinciding with a refresh of the display 102 and causing display flicker.

Next, in step 418, while performing the synchronized touch scan pattern, the touchscreen controller 104 checks if a new synchronization pulse 202 is detected before the second pulse-checking timer expires. If no new synchronization pulse 202 is detected, then the touchscreen controller 104 returns to step 402 and uses the default non-synchronized touch scan pattern. If a new synchronization pulse 202 is detected, then the touchscreen controller 104 proceeds to step 420.

In step 420, the touchscreen controller 104 checks if the new synchronization pulse 202 was detected before the end of the expected current pulse interval or at the end of the expected current pulse interval (e.g., when the second pulse-checking timer expired). If the new synchronization pulse 202 was detected at the end of the expected current pulse interval, then the display refresh rate has not changed, and the touchscreen controller proceeds to step 422. If the new synchronization pulse 202 was detected before the end of the expected current pulse interval, then the host 106 has changed the display refresh rate to a faster rate, and the touchscreen controller 104 proceeds to step 424.

In step 422, the touchscreen controller 104 starts a third pulse-checking timer to count down over a time interval equal to the expected current pulse interval of the current display refresh rate. The third pulse-checking timer is set to count down until the next expected synchronization pulse 202 from the display controller 105. The touchscreen controller 104 then returns to step 416 and continues to run the synchronized touch scan pattern that is synchronized with the current display rate found in step 414.

In step 424, the touchscreen controller 104 stops any touch scan being executed when the synchronization pulse 202 is received in step 418. This reduces or prevents display flicker that may occur when a touch scan coincides with a refresh of the display 102. The touchscreen controller 104 then returns to step 414 to calculate the new display refresh rate from the interval between the two most recently received synchronization pulses 202.

As described above with respect to the method 200, the method 400 may be implemented in the touchscreen controller 104 or other suitable device by instructions contained in software, firmware, hardware, or a combination thereof, and the details are not repeated herein.

Figure 5:
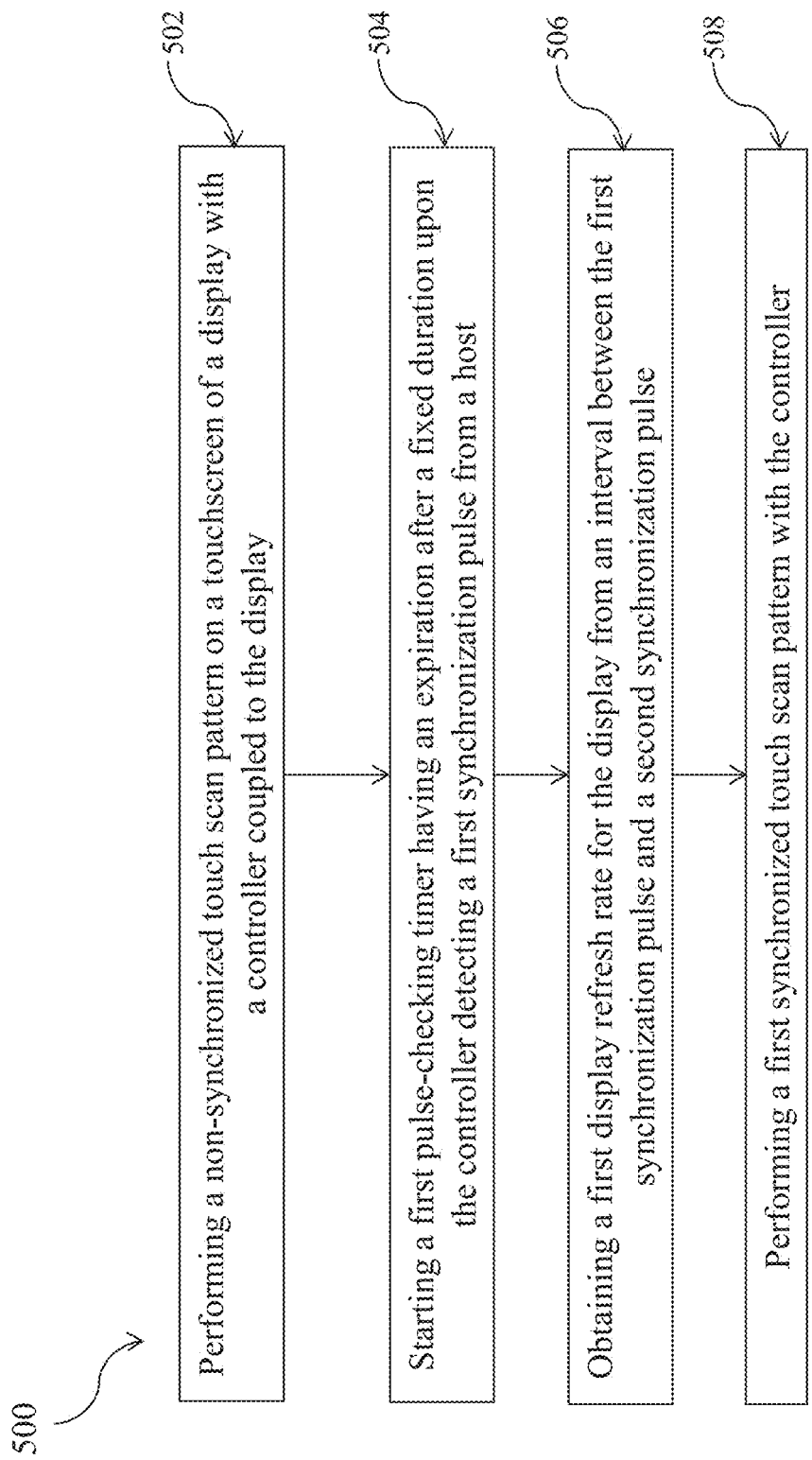
FIG. 5 illustrates a flowchart of another method for operating a display, in accordance with some embodiments.

FIG. 5 illustrates a flowchart of a method 500 for operating a display 102, in accordance with some embodiments. Step 502 includes performing a non-synchronized touch scan pattern on a touchscreen of a display 102 with a controller (e.g., a touchscreen controller 104) coupled to the display. The non-synchronized touch scan pattern schedules touch scans independent of a refresh rate of the display 102. Step 502 is similar to step 402 described above with respect to FIG. 4 as well as FIGS. 2 and 3. An advantage of performing step 502 is that by performing the non-synchronized touch scan pattern, the controller may maintain the desired touch report rate. This may avoid situations, such as while the display refresh rate is not known by the controller 104, where touch reporting is frozen and the electronic device 100 (see above, FIG. 1) fails to respond to touches of a user.

Step 504 includes starting a first pulse-checking timer having an expiration after a fixed duration upon the controller detecting a first synchronization pulse 202 from a display controller 105 coupled to the controller and the display 102. Step 504 is similar to step 412 described above with respect to FIG. 4. An advantage of performing step 504 is that the first pulse-checking timer will allow the controller to detect changes in the display refresh rate without any notification from the display controller 105 or the host 106 in addition to the synchronization pulses 202.

Step 506 includes obtaining a first display refresh rate for the display 102 from an interval between the first synchronization pulse 202 and the second synchronization pulse 202 upon detecting a second synchronization pulse 202 from the display controller 105. The second synchronization pulse 202 is detected before the first pulse-checking timer expires. Step 506 is similar to step 414 described above with respect to FIG. 4 as well as FIGS. 2 and 3. An advantage of performing step 506 is that it allows the display refresh rate to be found without notification from the display controller 105 or the host 106 (in addition to the synchronization pulses 202).

Step 508 includes performing a first synchronized touch scan pattern with the controller 104. The first synchronized touch scan pattern is scheduled to avoid touch scans coinciding with refreshes of the display 102 performed at the first display refresh rate. Step 508 is similar to step 416 described above with respect to FIG. 4 as well as FIGS. 2 and 3. An advantage of performing step 508 is that display flicker associated with touch scans coinciding with refreshes of the display 102 is reduced, improving display performance for the user.

Figure 6:
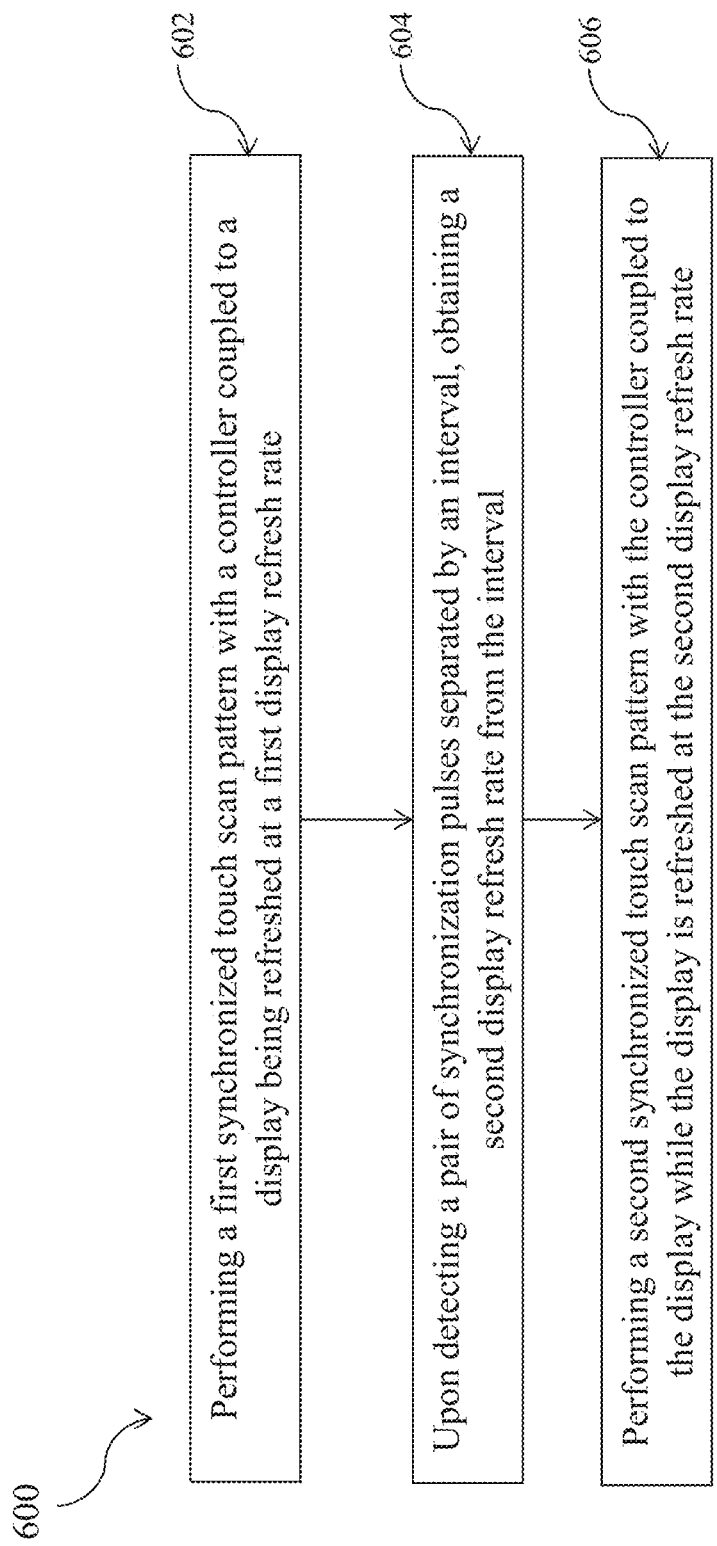
FIG. 6 illustrates a flowchart of yet another method for operating a display, in accordance with some embodiments.

FIG. 6 illustrates a flowchart of a method 600 for operating a touchscreen (e.g., a display 102), in accordance with some embodiments. Step 602 includes performing a first synchronized touch scan pattern with a controller (e.g., a touchscreen controller 104) coupled to a display 102. The first synchronized touch scan pattern is scheduled to avoid touch scans coinciding with refreshes of the display 102 performed at a first display refresh rate. A display controller 105 provides synchronization pulses 202 to the controller while performing at the first display refresh rate. The synchronization pulses 202 are separated by a first interval. Step 602 is similar to step 416 described above with respect to FIG. 4 as well as FIGS. 2 and 3. An advantage of performing step 602 is that display flicker associated with touch scans coinciding with refreshes of the display 102 is reduced, improving display performance for the user.

Step 604 includes obtaining a second display refresh rate from the second interval upon detecting a pair of synchronization pulses 202 being separated by a second interval. The second interval is different from the first interval. Step 604 is similar to step 414 described above with respect to FIG. 4 as well as FIGS. 2 and 3. An advantage of performing step 604 is that it allows the display refresh rate to be found without notification from the display controller 105 or the host 106 (in addition to the synchronization pulses 202).

Step 606 includes performing a second synchronized touch scan pattern with the controller coupled to the display 102. The second synchronized touch scan pattern is scheduled to avoid touch scans coinciding with refreshes of the display 102 performed at the second display refresh rate. Step 606 is similar to step 416 described above with respect to FIG. 4 as well as FIGS. 2 and 3. An advantage of performing step 606 is that display flicker associated with touch scans coinciding with refreshes of the display 102 is reduced, improving display performance for the user.

Example embodiments of the disclosure are summarized here. Other embodiments can also be understood from the entirety of the specification as well as the claims filed herein.

Example 1. A method of operating a display, the method including: performing, on a touchscreen of a display, a non-synchronized touch scan pattern with a controller coupled to the display, where the non-synchronized touch scan pattern schedules touch scans independent of a refresh rate of the display; upon the controller detecting a first synchronization pulse from a display controller coupled to the controller and the display, starting a first pulse-checking timer having an expiration after a fixed duration; upon detecting a second synchronization pulse from the display controller and before the first pulse-checking timer expires, obtaining a first display refresh rate for the display from an interval between the first synchronization pulse and the second synchronization pulse; and performing a first synchronized touch scan pattern with the controller, the first synchronized touch scan pattern being scheduled to avoid touch scans coinciding with refreshes of the display performed at the first display refresh rate.

Example 2. The method of example 1, further including: performing a touch scan; and upon receiving a third synchronization pulse while the touch scan is being performed, cancelling the touch scan.

Example 3. The method of one of examples 1 or 2, where the first synchronization pulse and the second synchronization pulse are vertical synchronization signals.

Example 4. The method of one of examples 1 to 3, where the first display refresh rate is obtained independently of notification of a change in display refresh rate.

Example 5. The method of one of examples 1 to 4, where performing the first synchronized touch scan pattern includes starting a second pulse-checking timer.

Example 6. The method of example 5, further including performing the non-synchronized touch scan pattern in response to determining that a fourth synchronization pulse is not received before the second pulse-checking timer expires.

Example 7. The method of example 5, further including continuing to run the first synchronized touch scan pattern in response to receiving a fourth synchronization pulse when the second pulse-checking timer expires.

Example 8. The method of example 5, where, in response to determining that a fourth synchronization pulse is received at the controller before the second pulse-checking timer expires, ending the first synchronized touch scan pattern, obtaining a second display refresh rate of the display from an interval between the fourth synchronization pulse and a fifth synchronization pulse received at the controller following the fourth synchronization pulse, and performing a second synchronized touch scan pattern scheduled to avoid touch scans coinciding with refreshes of the display performed at the second display refresh rate.

Example 9. A method of operating a touchscreen, the method including: performing a first synchronized touch scan pattern with a controller coupled to a display, the first synchronized touch scan pattern being scheduled to avoid touch scans coinciding with refreshes of the display performed at a first display refresh rate, where display controller provides synchronization pulses to the controller while performing at the first display refresh rate, the synchronization pulses being separated by a first interval; upon detecting a pair of synchronization pulses being separated by a second interval, the second interval being different from the first interval, obtaining a second display refresh rate from the second interval; and performing a second synchronized touch scan pattern with the controller coupled to the display, the second synchronized touch scan pattern being scheduled to avoid touch scans coinciding with refreshes of the display performed at the second display refresh rate.

Example 10. The method of example 9, further including cancelling a last touch scan of the first synchronized touch scan pattern upon receiving a first synchronization pulse of the pair of synchronization pulses while the last touch scan is being performed.

Example 11. The method of one of examples 9 or 10, where the controller is configured to obtain the second display refresh rate independently of notification of a change from the first display refresh rate to the second display refresh rate.

Example 12. The method of one of examples 9 to 11, further including performing a non-synchronized touch scan pattern with the controller coupled to the display upon receiving a first synchronization pulse of the pair of synchronization pulses.

Example 13. The method of one of examples 9 to 12, further including performing a non-synchronized touch scan pattern with the controller coupled to the display upon startup of the controller.

Example 14. The method of example 13, further including ending the non-synchronized touch scan pattern after obtaining the first display refresh rate from synchronization pulses provided from the display controller to the controller.

Example 15. A touchscreen controller including: a non-transitory memory including a program; and a processor coupled to the non-transitory memory and configured to execute the program, the program including instructions to: upon startup, run a display at a default non-synchronized touch scan pattern, the display being coupled to the touchscreen controller; stop a touch scan being executed upon detecting a synchronization pulse received from a display controller, the display controller being coupled to the touchscreen controller and the display; obtain a display refresh rate from intervals between synchronization pulses received from the display controller; and run the display with a synchronized touch scan pattern, the synchronized touch scan pattern being scheduled to avoid touch scans coinciding with refreshes of the display performed at the display refresh rate.

Example 16. The touchscreen controller of example 15, where the non-transitory memory is firmware of the touchscreen controller.

Example 17. The touchscreen controller of one of examples 15 or 16, where the display is an organic light emitting diode (OLED) touchscreen.

Example 18. The touchscreen controller of example 17, where the OLED touchscreen includes low-temperature polycrystalline oxide.

Example 19. The touchscreen controller of one of examples 17 or 18, where the program further includes instructions to obtain the display refresh rate without notification of a change in the display refresh rate.

Example 20. The touchscreen controller of one of examples 17 or 19, where the touchscreen controller is further programmed to start a pulse-checking timer upon detecting the synchronization pulse received from the display controller.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method of operating a touchscreen, the method comprising:
    performing a first synchronized touch scan pattern with a controller coupled to a display, the controller comprising a first processing chip, the first synchronized touch scan pattern being scheduled to avoid touch scans coinciding with refreshes of the display performed at a first display refresh rate, wherein a display controller provides synchronization pulses to the controller while performing at the first display refresh rate, the display controller comprising a second processing chip, the synchronization pulses being separated by a first interval;
    upon detecting a pair of synchronization pulses being separated by a second interval, the second interval being different from the first interval, obtaining a second display refresh rate from the second interval; and
    performing a second synchronized touch scan pattern with the controller coupled to the display, the second synchronized touch scan pattern being scheduled to avoid touch scans coinciding with refreshes of the display performed at the second display refresh rate.

2. The method of claim 1, further comprising cancelling a last touch scan of the first synchronized touch scan pattern upon receiving a first synchronization pulse of the pair of synchronization pulses while the last touch scan is being performed.

3. The method of claim 1, wherein the controller is configured to obtain the second display refresh rate independently of notification of a change from the first display refresh rate to the second display refresh rate.

4. The method of claim 1, further comprising performing a non-synchronized touch scan pattern with the controller coupled to the display upon receiving a first synchronization pulse of the pair of synchronization pulses.

5. The method of claim 1, further comprising performing a non-synchronized touch scan pattern with the controller coupled to the display upon startup of the controller.

6. The method of claim 5, further comprising ending the non-synchronized touch scan pattern after obtaining the first display refresh rate from synchronization pulses provided from the display controller to the controller.

7. The method of claim 1, wherein the synchronization pulses are vertical synchronization pulses.

8. The method of claim 1, wherein the synchronization pulses are horizontal synchronization pulses.

9. A method of operating a touchscreen, the method comprising:
    performing a first synchronized touch scan pattern with a controller coupled to a display, the controller comprising a first processing chip, the first synchronized touch scan pattern being scheduled to avoid touch scans coinciding with refreshes of the display performed at a first display refresh rate;
    detecting a pair of synchronization pulses being separated by an interval;
    obtaining a second display refresh rate from the interval, the second display refresh rate being different from the first display refresh rate; and
    performing a second synchronized touch scan pattern with the controller coupled to the display while the display is refreshed at the second display refresh rate.

10. The method of claim 9, further comprising, after detecting a first synchronization pulse of the pair of synchronization pulses, performing a non-synchronized touch scan pattern with the controller coupled to the display.

11. The method of claim 10, wherein the non-synchronized touch scan pattern schedules touch scans independent of a refresh rate of the display.

12. The method of claim 9, wherein the touchscreen is part of a smartphone.

13. The method of claim 9, wherein the display comprises low-temperature polycrystalline oxide.

14. The method of claim 9, wherein the pair of synchronization pulses are vertical synchronization pulses sent from a display controller, the display controller comprising a second processing chip.

15. A method of operating a touchscreen, the method comprising:
    performing a first synchronized touch scan pattern with a controller coupled to a display, the controller comprising a first processing chip, the first synchronized touch scan pattern being scheduled to avoid touch scans coinciding with refreshes of the display performed at a first display refresh rate, a display controller providing synchronization pulses to the controller while performing at the first display refresh rate, the display controller comprising a second processing chip, the synchronization pulses being separated by a first interval;
    upon detecting a pair of synchronization pulses being separated by a second interval, the second interval being different from the first interval, obtaining a second display refresh rate from the second interval independently of a notification from the display controller of the second display refresh rate; and
    performing a second synchronized touch scan pattern with the controller coupled to the display, the second synchronized touch scan pattern being scheduled to avoid touch scans coinciding with refreshes of the display performed at the second display refresh rate.

16. The method of claim 15, wherein performing the first synchronized touch scan pattern and the second synchronized touch scan pattern reduces display flicker.

17. The method of claim 15, wherein the pair of synchronization pulses are vertical synchronization pulses.

18. The method of claim 15, wherein the pair of synchronization pulses are horizontal synchronization pulses.

19. The method of claim 15, wherein the display comprises organic light emitting diodes.

20. The method of claim 15, wherein the display comprises low-temperature polycrystalline oxide.

* * * * *